United States Patent
Connick, Jr. et al.

[15] 3,655,435

[45] Apr. 11, 1972

[54] PROCESS FOR IMPARTING WATER- AND OIL-REPELLENT EMULSION FINISH FOR CELLULOSIC MATERIALS

[72] Inventors: William J. Connick, Jr.; Samuel E. Ellzey, Jr., both of New Orleans, La.

[73] Assignee: The United States of America as represented by the Secretary of Agriculture

[22] Filed: May 27, 1969

[21] Appl. No.: 841,176

Related U.S. Application Data

[62] Division of Ser. No. 655,266, July 20, 1967, Pat. No. 3,518,218.

[52] U.S. Cl. ............... 117/139.5 A, 117/102, 117/135.5, 117/143 A
[51] Int. Cl. ............................................. D06m 15/16
[58] Field of Search .............. 117/139.5 A, 143 A, 135.5, 117/121, 161 UC

[56] References Cited

UNITED STATES PATENTS

| | | | |
|---|---|---|---|
| 3,198,754 | 8/1965 | Ahlbrecht et al. | 260/2 |
| 3,300,274 | 1/1967 | Pittman et al. | 8/127.6 |
| 3,380,943 | 4/1968 | Enders et al. | 260/29.2 |

Primary Examiner—William D. Martin
Assistant Examiner—Theodore G. Davis
Attorney—R. Hoffman and W. Bier

[57] ABSTRACT

A process is described for preparing a stable aqueous emulsion of a polymer derived from an alkyl perfluoralkanoate and an alkylenimine, employing 2.5–10 percent (based on total solvent weight) of a water-miscible polymer solvent, and special emulsifiers.

When fibrous cellulosic materials are treated with such emulsions using about from 1 to about 10 weight percent (based on the total emulsion weight) of the fluorinated ester, the resultant treated materials are rendered durably oleophobic and slightly hydrophobic. These desirable properties may be imparted by a simple drying step without resorting to a high temperature cure step.

2 Claims, No Drawings

PROCESS FOR IMPARTING WATER-AND OIL-REPELLENT EMULSION FINISH FOR CELLULOSIC MATERIALS

This application is a division of application bearing Ser. No. 655,266, filed July 20, 1967, now U.S. Pat. No. 3,518,218.

FIELD OF THE INVENTION

This invention relates to an aqueous emulsion and to a process for its preparation. More specifically, the invention relates to an aqueous emulsion comprising a polymer derived from an alkyl perfluoroalkanoate and an alkylenimine. Still more specifically, the invention relates to a method for the preparation of such emulsions and describes a method for treating cellulosic materials with the polyfluorinated polymer emulsion to produce a surface which is highly oleophobic and slightly hydrophobic. The resultant treated fibrous material shows little, if any, physical damage as a result of the treatment.

DEFINITION OF TERMS

As used herein, the term "fibrous cellulosic material" includes woven or nonwoven webbing comprising cotton, linen, hemp, paper, jute, rayon, and the like. Because of its wide use in the textile industry, "cotton" will frequently be referred to below as the cellulosic material although this invention is not limited to cotton.

DESCRIPTION OF THE ART

In the copending application of Samuel E. Ellzey, Jr., Jerry P. Moreau, William J. Connick, Jr., and James S. Wittman, III, Ser. No. 655,732, now abandoned, there is described, among others, the reaction of ethylenimine (3 moles) with an alkyl perfluroalkanoate (1 mole) of the formula $R_FCO_2R$, wherein $R_F$ is a straight or branched-chain polyfluorinated group, and more particularly a perfluorinated group containing about from 3 to about 9 carbon atoms and R is a lower alkyl group such as methyl or ethyl, yielding a polyfluorinated polymeric product which is useful for imparting high oil repellency and slight water repellency to cellulosic materials when it is applied from organic solvents.

Although organic solvents have been used in the application of various chemical finishes to cellulosic materials such as cotton fabric, among others, common practice usually restricts the application of such finishes to the use of substantially aqueous treating baths wherever possible, since the cost of recovering organic solvents for reuse is often high, and many of the common solvents are flammable.

It has now been found possible to incorporate polyfluorinated polymors of the above type into a substantially aqueous system which, when used to treat cellulosic materials, imparts thereto high oil repellency and slight water repellency, these properties being durable to repeated home-type launderings and to extraction with perchloroethylene. By a substantially aqueous emulsion is meant one in which the water comprises about from 90–97.5 percent (by weight) of the total solvent employed.

The specially designed aqueous solvent consists of about from 2.5 percent to about 10 percent (based on the total weight of the solvent) of a water-miscible organic solvent, such as 2-ethoxyethanol. On either side of this range of concentrations of 2-ethoxyethanol the emulsion is unstable with the emulsifiers used; within this concentration range the emulsion is stable for at least 30 days. The inclusion of this water-miscible organic solvent, which is also a solvent for the polyfluorinated polymer, is necessary for successful emulsification.

The common types of emulsifiers were found to be unsatisfactory for use in emulsifying this fluorinated polymer. However, certain fluorinated emulsifiers were found to be suitable. The preferred emulsifiers are the perfluoroalkanoate salts and in particular ammonium perfluoroalkanoates, such as ammonium perfluorooctanoate, $O_7F_{15}CO_2NF_4$, made readily by reacting ammonia with the fluorinated acid. A satisfactory commercially available fluorochemical emulsifier is sold under the designation FC–128 by the 3M Co., St. Paul, Minnesota. While this emulsifier produces fairly stable emulsions, it has the disadvantage of causing yellowing in treated white cellulosic materials, although it produces emulsions which otherwise may be useful.

The emulsion of the fluorinated polymer in the specially designed solvent is preferably prepared by emulsifying the preformed polymer, rather than by combining the separate ingredients in an emulsion system. Polymer formation by the latter process is apparently quite slow and the repellent properties of cellulosic materials treated with such emulsions are of a very low order.

In a preferred embodiment of this invention the polyfluorinated polymer is formed as described in the copending application noted above, whereby at least 3 mole-equivalents of ethylenimine are added to 1 mole-equivalent of cold ethyl perfluorooctanoate and the contact time is about from 1 minute to about 1 hour. Greater contact times lead to an insoluble polymer or to unstable emulsions. The polymer formed is then dissolved in the requisite amount of 2-ethoxyethanol with stirring, the emulsifier is added to the polymer solution, after which water is added before the mixture is rapidly stirred. The emulsion formed is almost completely clear; within a few days it may become slightly cloudy, but polymer deposition does not usually occur within 30 days.

Effective concentrations of the two useful emulsifiers lie in the range of about from 1 percent to 3 percent or greater (based on the weight of the emulsion) but the preferred concentration is about 2 percent.

Concentrations of fluorinated ester which impart useful repellency to cotton fabrics are in the range about from 1 percent to about 10 percent (based on total emulsion weight), or even higher. Preferred concentrations of ester are 1.25–5 percent. Aged emulsions prepared by the preferred procedure were used to treat cotton printcloth after up to about 30 days standing time and results were comparable to those obtained with freshly prepared emulsions.

In order to fix the polyfluorinated polymer on the treated cellulosic material after its application from the emulsion, it is necessary merely to dry the treated material. This may be accomplished under very mild conditions such as line-drying at room temperature, although drying in an oven at temperatures up to about 125° C may also be used. Since the usual high temperature curing step is not necessary, the process of the present invention may be employed with delicate fabrics or in conjunction with heat-sensitive finishes without impairing the useful properties of the original material.

The advantages of a finish which imparts high oleophobicity to fibrous cellulosic materials are readily apparent. The further advantage to be gained from such a finish which is also only slightly water-repellent will become apparent from the following. Oil-repellent finishes which are also highly water-repellent are difficult to wash free of ground-in oily soil because of their high water repellency. A finish with high oil repellency, but low water repellency, such as that imparted by the process of the present invention, being more readily wet by water, is more easily cleaned when soiled with oily particles. The finish imparted by the process of the present invention also suffers less from oily soil redeposition upon laundering than does the highly water-repellent, highly oil-repellent finish. In other words, materials finished by the process of the present invention have less tendency to pick up particles of oily soil from dirty wash water during laundering.

The following examples are given by way of illustration and are not to be construed as limitations of the scope of this invention.

EXAMPLE 1

To 15 g. (0.034 mole) of ethyl perfluorooctanoate cooled in an ice bath was added 4.4 g. (0.10 mole) of ethylenimine. After the exothermic reaction ceased the mixture was allowed to stand at room temperature for about 1 min. before the addition of 15 g. of 2-ethoxyethanol. After brief stirring, 6.0 g. of ammonium perfluorooctanoate was added and stirring was continued until the solid was dissolved. To the solution was added 260 g. of distilled water, followed by mixing for 1 min. with a high-speed stirrer. The emulsion was padded onto cotton printcloth and the fabric was dried at 80° C. for 5 min. and then washed for 30 min. in hot, running water before line-drying. The add-on was 4.5%; the 3M oil rating [Textile Research J., 32, 320 (1962)] was 120, and the spray rating [AATCC test 22-1964] was 50. After a 2-hr. extraction with perchloroethylene and a 30 min. hot water rinse the oil rating was 120 and the spray rating was 70. After 5 and 10 complete home laundry cycles (agitator-type washer and electric tumble-drier) the oil rating was 100 and 80, respectively. Comparable results were obtained when printcloth was treated with this emulsion after it had aged for up to 30 days.

EXAMPLE 2

An emulsion was prepared according to Example 1 except that 5 g. (0.011 mole) of ethyl perfluorooctanoate, 1.5 g. (0.035 mole) of ethylenimine, 2.0 g. of the commercially available FC-128, 5 g. of 2-ethoxyethanol, and 86.5 g. of water were used. Cotton printcloth was treated with the emulsion as in Example 1 to give an add-on of 5.1 percent and an oil rating of 130 and spray rating of 50. After a 2-hr. extraction with perchloroethylene the oil rating was 110. After 10 complete home laundry cycles the oil rating was 100. The initial color of the treated fabric was slightly more yellow than that of the preceeding example. Similar results were obtained when an emulsion which had been aged for 1 week was used.

EXAMPLE 3

An emulsion was prepared as in Example 1, and portions were aged for 3, 14, and 30 days prior to application to cotton fabric. Results are shown in the following table.

| Aging time, days | Percent add-on | Initial Oil rating | Initial Spray rating | Oil rating After extraction | Oil rating After 5 laund. |
|---|---|---|---|---|---|
| 3 | 5.7 | 120 | 50 | 90 | 100 |
| 14 | 5.7 | 120 | 50 | 90 | 110 |
| 30 | 4.8 | 120 | 50 |  | 120 |

EXAMPLE 4

An emulsion was prepared as in Example 1 except that the concentrations of ester and imine were halved. Cotton printcloth padded with the emulsion had an add-on of 1.8 percent, an oil rating of 110, and a spray rating of 50. After a 2-hr. extraction with perchloroethylene or 5 launderings, the oil ratings were 80 and 50, respectively.

We claim:
1. A process for imparting a highly oleophobic, slightly hydrophobic finish to a cellulosic fibrous material, said finish being durable to home-type laundering and resistant to extraction with perchloroethylene, said process comprising:
   a. padding onto the cellulosic fibrous material an emulsion consisting of a stirred mixture of (1) a preformed polymer obtained from the reaction of one-mole-equivalent of ethyl perfluorooctanoate and three mole-equivalents of ethylenimine, (2) a solvent consisting of from 2.5 to 10 weight percent of 2-ethoxyethanol and 97.5 to 90 weight percent of water, and (3) 1 to 3 weight percent, based on the weight of the total emulsion, of ammonium perfluorooctanoate as the emulsifier;
   b. drying the padded material of step (a) at about 80° C., for about 5 minutes; and
   c. removing any unattached polymer from the dried material by washing it in hot running water and then drying it.
2. The process of claim 1 wherein the preformed polymer of step (a) is present in about form 1 to 10 weight percent of the total emulsion.

* * * * *